United States Patent
Devol

[15] 3,706,461
[45] Dec. 19, 1972

[54] WHEELBARROW ASSEMBLY
[72] Inventor: Paris E. Devol, 122 Cardinal Lane, Tabbs, Va.
[22] Filed: Feb. 12, 1971
[21] Appl. No.: 114,840

[52] U.S. Cl. ............................. 280/47.26, 280/47.33
[51] Int. Cl. .............................................. B62b 1/10
[58] Field of Search..280/47.12, 47.24, 47.26, 47.31, 280/47.33; 298/2, 3

[56] References Cited

UNITED STATES PATENTS

| | | | |
|---|---|---|---|
| 2,553,334 | 5/1951 | Schmidt | 280/47.31 |
| 2,121,224 | 6/1938 | Garlinghouse | 298/2 |
| 1,544,769 | 7/1925 | Nalder | 298/3 |

FOREIGN PATENTS OR APPLICATIONS

| | | | |
|---|---|---|---|
| 76,392 | 3/1950 | Norway | 280/47.26 |
| 455,090 | 3/1949 | Canada | 280/47.24 |
| 1,155,562 | 12/1957 | France | 280/47.26 |
| 480,333 | 2/1938 | Great Britain | 280/47.24 |
| 832,232 | 4/1960 | Great Britain | 280/47.26 |

*Primary Examiner*—Leo Friaglia
*Assistant Examiner*—Leslie J. Paperner
*Attorney*—Finnegan, Henderson, Farabow & Garrett

[57] ABSTRACT

A wheelbarrow assembly having a low slung frame member and two wheels mounted on separate axles. Two handle members of carefully selected dimensions extend upwardly and outwardly from the frame member and at a predetermined angle therewith whereby a large leverage factor is provided for the operator together with strong load support for easy maneuverability.

7 Claims, 4 Drawing Figures

INVENTOR
PARIS E. DeVOL

BY
Finnegan, Henderson Farabow
ATTORNEYS

INVENTOR
PARIS E. DE VOL
BY Finnegan, Henderson & Farabow
ATTORNEYS

WHEELBARROW ASSEMBLY

This invention relates to wheelbarrows and more particularly to a wheelbarrow assembly capable of easily carrying heavy loads while providing a high degree of maneuverability.

Many types and designs of wheelbarrows have been developed throughout the years. One type of well-known wheelbarrow is provided with a single wheel at the forward end. Although this type of wheelbarrow has served the purpose, it has not proved entirely satisfactory under all conditions of service because it has required that the operator lift the entire load together with the weight of the wheelbarrow while pivoting the load and the wheelbarrow about the forward wheel. Not only have these wheelbarrows been difficult to push under conditions of heavy loads, but they have proved to be highly unstable. The tendency to tip and to spill the contents of the wheelbarrow is great, and such tipping frequently occurs, particularly when traveling over uneven ground.

Still other wheelbarrow designs have been developed which have utilized two wheels positioned on either side of the wheelbarrow. In many of these the load has been positioned over or almost over the wheels to considerably reduce the effort required by the operator in moving the load. Greater stability has also been provided by such two-wheeled designs. However, many of these two-wheeled designs have proved to be awkward or difficult to use because they are not designed to require minimum effort on the part of the operator and because they have not provided the best possible leverage factor.

It is, therefore, an object of the present invention to provide a wheelbarrow assembly for carrying heavy loads while requiring only a minimum effort by the operator.

Another object is to provide a wheelbarrow assembly that is highly maneuverable.

A further object of the invention is the provision of a wheelbarrow from which the load can be readily dumped and which is readily stored by positioning the wheelbarrow on end.

Additional objects and advantages of the invention will be set forth in part in the description which follows, and in part will be obvious from the description, or may be learned by practice of the invention. The objects and advantages are realized and attained by means of the instrumentalities and the combinations particularly pointed out in the appended claims.

To achieve these and other objects the present invention provides a wheelbarrow assembly having a low slung frame member and two wheels mounted on separate axles to provide greater maneuverability. Two free-ended handle members of predetermined length extend from the frame member at a predetermined angle therewith to provide optimum leverage for the operator in lifting and moving heavy loads.

More specifically, the present invention provides a wheelbarrow assembly comprising: a substantially square-shaped frame member defining a plane and including front, rear, and first and second side bars, the side bars each having a wheel axle receiving aperture therein; a first axle support in spaced adjacent relationship with the first side bar and fixedly attached to the front and rear bars, the first axle support having a wheel axle receiving aperture therein for enabling a wheel to be mounted between the first side bar and the first axle support; a second axle support in spaced adjacent relationship with the second side bar and fixedly attached to the front and rear bars, the second axle support having a wheel axle receiving aperture therein for enabling a wheel to be mounted between the second side bar and the second axle support; a first support member fastened to the front bar at a location adjacent the mid-point of the front bar between the side bars and fastened to the rear bar at a location between the first side bar and the mid-point of the rear bar between the side bars; a second support member fastened to the front bar at a location adjacent the mid-point of the front bar between the side bars and fastened to the rear bar at a location between the second side bar and the mid-point of the rear bar between the side bars; first and second free-ended handle members extending from the first and second support members respectively, and at a predetermined angle with respect to the plane defined by the front, rear, and side bars; and a stand extending downwardly from the frame member to permit the wheelbarrow assembly to rest on the wheels and on the stand.

The predetermined angle between the handle members and the plane defined by the front, rear, and side bars of the frame assembly is preferably from 25° to 35°. Each of the handle members is preferably from 35 inches to 37 inches long and the wheels and the stand support preferably support the frame member with the rear bar substantially 9 inches from the ground and with the front bar substantially 11 inches from the ground.

It is to be understood that both the foregoing general description and the following detailed description are exemplary and explanatory only and are not restrictive of the invention.

The accompanying drawings, which are incorporated in and constitute a part of this specification, illustrate an example of a preferred embodiment of the invention and together with the description serve to explain the principles of the invention.

Figure 2:
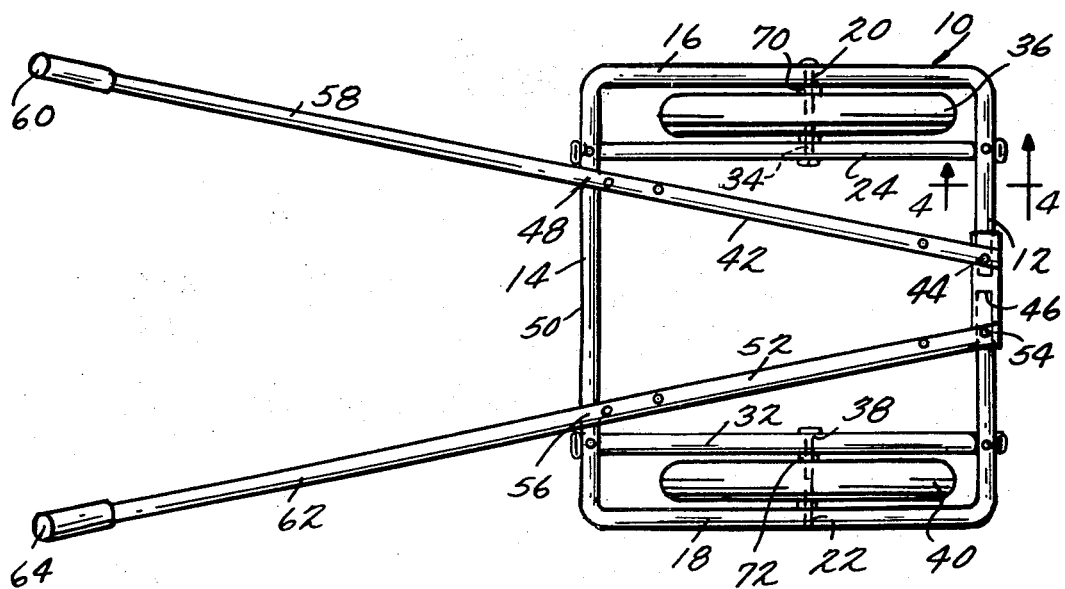
FIG. 2 is a plan view of the wheelbarrow assembly shown in FIG. 1.

With reference now to the drawings, wherein like reference characters designate like or corresponding parts throughout the several views, there is shown a substantially square-shaped frame member 10 defining a plane and including a front bar 12, a rear bar 14 and first and second side bars 16 and 18, respectively. First side bar 16 has a wheel axle receiving aperture 20 therein and side bar 18 has a wheel axle receiving aperture 22 therein. Wheel axle receiving apertures 20 and 22 are closer to front bar 12 than to rear bar 14 as best seen in FIG. 2.

A first axle support 24 is positioned in spaced adjacent relationship with respect to first side bar 16 and is fixedly attached to the front and rear bars by means of machine bolts 26, nuts 28 and lockwashers 30 (FIG.

Figure 4:
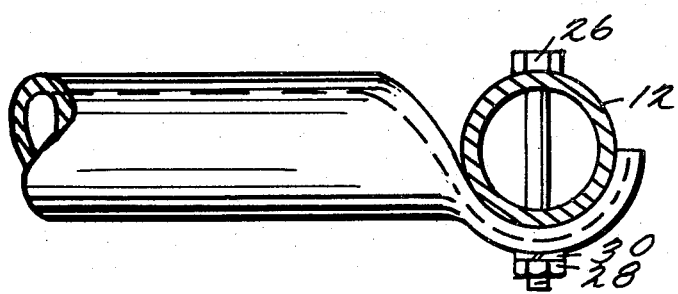
FIG. 4 is a section taken on the line 4—4 in FIG. 2.

4). A second axle support 32 is similarly positioned in spaced adjacent relationship with respect to second side bar 18 and is fixedly attached to the front and rear bars, as illustrated in FIG. 4.

First axle support 24 has a wheel axle receiving aperture 34 therein for enabling a wheel 36 to be mounted between first side bar 16 and first axle support 24. As best seen in FIG. 2 wheel axle receiving aperture 34 is closer to front bar 12 than to rear bar 14 and is aligned with wheel axle receiving aperture 20 of first side bar 16. Likewise, second axle support 32 has a wheel axle receiving aperture 38 therein for enabling a wheel 40 to be mounted between side bar 18 and axle support 32. Wheel axle receiving aperture 38 is closer to front bar 12 than to rear bar 14 and is aligned with wheel axle receiving aperture 22 of second side bar 18. This double-axle arrangement, whereby each wheel 36 and 40 is mounted on a separate axle, provides greatly increased maneuverability for the wheelbarrow.

A first support member 42 is fastened to front bar 12 at a location 44 adjacent the mid-point 46 of the front bar. Support member 42 is also fastened to rear bar 14 at a location 48 between first side bar 16 and the mid-point 50 of the rear bar.

Similarly, a second support member 52 is fastened to the front bar at a location 54 adjacent the mid-point 46 of the front bar and is fastened to the rear bar at a location 56 between side bar 18 and the mid-point 50 of the rear bar.

A first handle member 58 having a free end 60 extends from support member 42, and a second handle member 62 having a free end 64 extends from support member 52. Each of the handle members is oriented at a predetermined angle with respect to the plane defined by front and rear bars 12, 14 and by side bars 16, 18. A stand 66 extends downwardly from support members 42 and 52, and this stand together with wheels 36 and 40 permit the wheelbarrow assembly to rest in a stable position when not in use.

Figure 3:
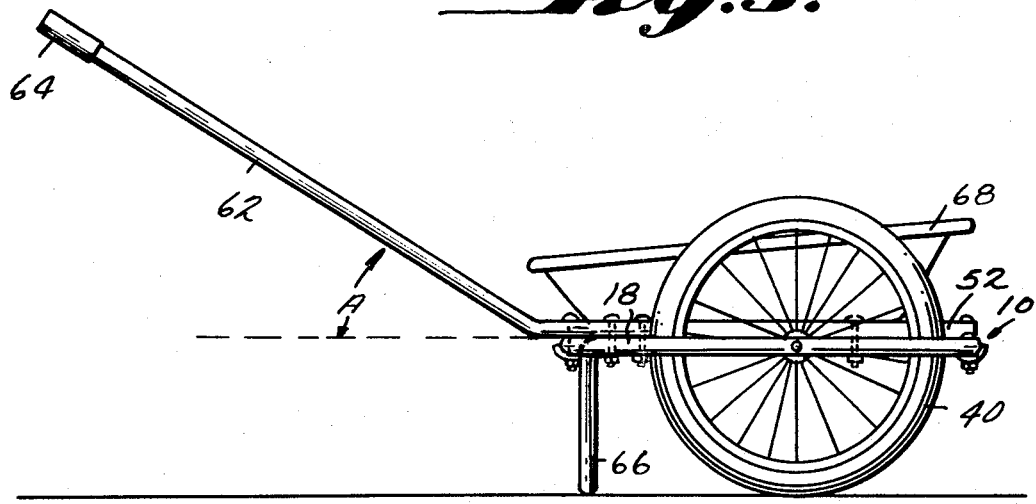
FIG. 3 is a side elevation of the wheelbarrow assembly.

The angle A (FIG. 3) between handle members 58 and 62 and the plane defined by the front, rear and side bars is preferably from 25° to 35°. Each of the handle members is also preferably from 35 inches to 37 inches long. The distance between locations 48 and 56 on rear bar 14 where the handle members intersect the rear bar is preferably 16 inches, and the free ends of the handle members are preferably spaced 29 inches apart. Stand 66 and wheels 36 and 40 are preferably sized to support the frame member with rear bar 14 approximately 9 inches from the ground and with front bar 12 approximately 11 inches from the ground.

By a critical use of dimensions of the various parts of the wheelbarrow assembly, critical relationships and critical spacing of the various parts, and by mounting wheels 36 and 40 on separate axles, a unique wheelbarrow assembly is provided that is extremely easy to operate and which is stable and highly maneuverable. The use of the critical dimensions and relationships in the assembly of this invention also creates an optimum leverage factor for the operator so that little effort is required to move even very heavy loads.

Figure 1:
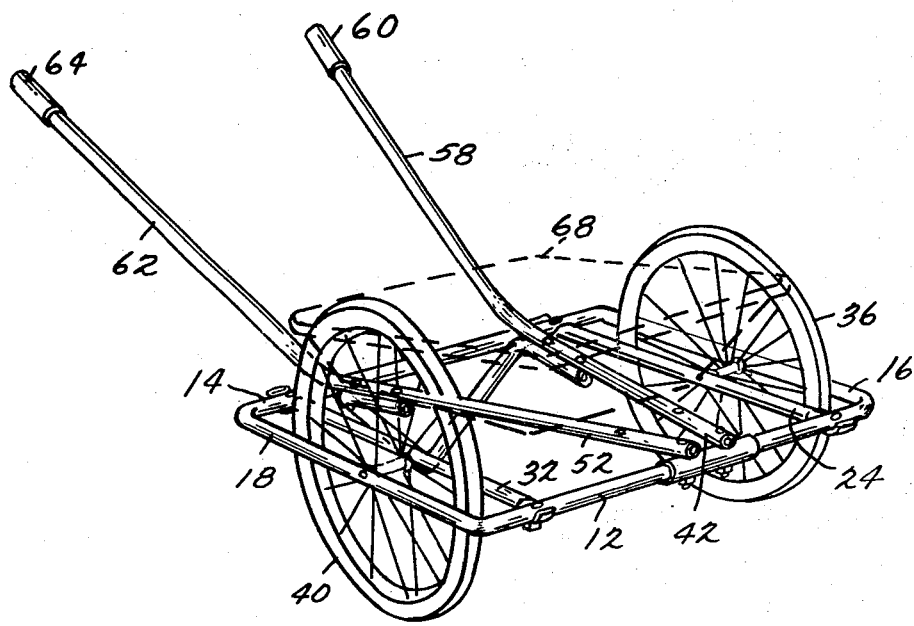
FIG. 1 is a perspective view of a preferred embodiment of the invention.

In operation, a tub 68 (FIG. 1) is fixedly mounted on first and second support members 42 and 52 by conventional means. Various sizes and shapes of tubs can be used in order to accommodate the wheelbarrow assembly to various load requirements. The center of the load and of the tub is positioned substantially over a line extending between axles 70 and 72 of the wheels so that when the operator lifts the handles, the weight of the load is distributed over the wheels. This significantly reduces the effort required by the operator because he is not required to lift the load as in a conventional single-wheel assembly.

The frame member of the wheelbarrow assembly of this invention is positioned relatively near to the ground, and the length of the handle members combined with the angle of the handle members with respect to the frame member and the individual mounting of the wheels provide an extremely maneuverable wheelbarrow that requires very little effort on the part of the operator in moving loads up to as much as 300 pounds.

In addition, free ends 60 and 64 of the handle members permit the operator to stand between the handle members with his arms straight down to grasp the handles located at the free ends. This feature, together with the critical angle of the handle members and their critical length combine with the low slung frame member to provide an extremely large leverage factor for the operator. Thus, the operator can lift the handle members with his arms straight down at his sides and can balance the load above axles 70 and 72.

The wheelbarrow assembly of this invention can be pushed or pulled up or down hill or over rough ground without tipping over and with almost the same amount of ease as traveling on level ground with a conventional wheelbarrow. Furthermore, dumping of the load from the assembly of this invention is quite easy. The load is pivoted about the wheels and the assembly is caused to move forward until it rests on front bar 12. The front bar lies on the ground as the operator raises the assembly to cause the contents of the tub to be dumped on the ground. This is a marked improvement over previously known single-wheel assemblies that frequently dump the load to the right or left rather than straight ahead because of the instability of the load when balanced on the single wheel.

When the wheelbarrow assembly of this invention is not in use it can be readily stored by standing it on its front end with front bar 12 resting on the ground.

The invention in its broader aspects is not limited to the specific details shown and described and departures may be made from such details without departing from the principles of the invention and without sacrificing its chief advantages.

What is claimed is:

1. A wheelbarrow assembly for movement over ground comprising:
   a low-slung frame member including front, rear and first and second side bars defining a plane, said side bars each having a wheel axle receiving aperture therein positioned closer to the front bar than to the rear bar;
   a first axle support in spaced adjacent relationship with said first side bar and fixedly attached to said front and rear bars, said first axle support having a wheel axle receiving aperture therein positioned closer to the front bar than to the rear bar and aligned with the wheel axle receiving aperture of said first side bar for enabling a wheel to be mounted between said first side bar and said first axle support;

a second axle support in spaced adjacent relationship with said second side bar and fixedly attached to said front and rear bars, said second axle support having a wheel axle receiving aperture therein positioned closer to the front bar than to the rear bar and aligned with the wheel axle receiving aperture of said second side bar for enabling a wheel to be mounted between said second side bar and said second axle support;

a first wheel mounted between said first axle support and said first side bar and a second wheel mounted between said second axle support and said second side bar, said wheels supporting said frame member closely adjacent ground level;

a first support member fastened to said front bar at a location adjacent the midpoint of the front bar between said side bars and fastened to said rear bar at a location between said first side bar and the midpoint of the rear bar between said side bars;

a second support member fastened to said front bar at a location adjacent the midpoint of the front bar between said side bars and fastened to said rear bar at a location between said second side bar and the midpoint of the rear bar between said side bars;

first and second free-ended handle members extending from said first and second support members respectively, and at a predetermined angle with respect to the plane defined by said front rear and side bars; and a stand extending downwardly from said support members to permit the wheelbarrow assembly to rest on the wheels and on said stand.

2. A wheelbarrow assembly as in claim 1 wherein said wheels are mounted on separate axles to provide increased load support and maneuverability for the assembly.

3. A wheelbarrow assembly as in claim 2 wherein said predetermined angle between said handle members and said plane defined by said front, rear and side bars is from 25° to 35°.

4. A wheelbarrow assembly as in claim 3 wherein each of said handle members is from 35 inches to 37 inches long, wherein the handle members are fastened 16 inches apart on said rear bar, and wherein the free ends of the handle members to be gripped are spaced 29 inches apart.

5. A wheelbarrow assembly as in claim 4 wherein said wheels are mounted in position between said first side bar and said first axle support and between said second side bar and said second axle support, respectively, and wherein the wheels and said stand support the frame member with said rear bar substantially 9 inches from the ground and with said front bar substantially 11 inches from the ground.

6. A wheelbarrow assembly as in claim 5 further including a tub removably mounted on said first and second support members.

7. A wheelbarrow assembly as in claim 2 further including a tub removably mounted on said first and second support members.

* * * * *